United States Patent [19]
Wieland et al.

[11] 3,823,826
[45] July 16, 1974

[54] HORIZONTAL FILTER PRESS

[75] Inventors: Dieter Wieland; Hans Becker, both of Bad Kreuznach, Germany

[73] Assignee: Seitz-Werke G.m.b.H., Bad Kreuznach, Germany

[22] Filed: Feb. 20, 1973

[21] Appl. No.: 333,765

[30] Foreign Application Priority Data
Feb. 21, 1972 Germany.......................... 2207984

[52] U.S. Cl.................................. 210/225, 210/231
[51] Int. Cl............................................ B01d 33/00
[58] Field of Search .......... 210/225, 227, 228, 230, 210/231

[56] References Cited
UNITED STATES PATENTS
3,360,130  12/1967  Kaga............................. 210/230 X
3,754,657  8/1973  Harp.................................. 210/230

Primary Examiner—Roy Lake
Assistant Examiner—DeWalden W. Jones
Attorney, Agent, or Firm—Walter Becker

[57] ABSTRACT

A horizontal filter press, which includes a device for separating the plates and which also includes a conveyor arrangement for conveying filter members into position to be supplied to opposite sides of the plates, with the conveyor arrangement including feeding and guiding means for withdrawing the filter members from the conveyor arrangement and for guiding the filter members into position relative to the plates. Also carried by the conveyor arrangement is a cleaning device operable for scraping the opposite sides of the filter plates and for supplying cleaning jets for cleaning the filter plates or the filter members thereon.

14 Claims, 5 Drawing Figures

PATENTED JUL 16 1974

3,823,826

HORIZONTAL FILTER PRESS

The present invention relates to a filter press of the horizontal type for the filtration of liquids with prefabricated filter layers or with an auxiliary filter cover deposited on holding layers, while the layers may be formed as individual layers or by means of a connecting back may be formed into double layers and with the respective filtering surface are inserted between the plate-shaped or frame-shaped filter elements which in the press follow each other.

With horizontal filter presses of smaller size it is customary manually to insert the individual or double layers, which are prefabricated as filter medium for the layer filtration or as holding layers (supporting layers) for the auxiliary filter cover in case of alluvial filtration. In the opened press, to this end, the elements detached from the filter packet are arranged in spaced relationship to each other and individual layers withdrawn from a simple package are while substantially standing on edge introduced from above or from the side between the elements.

A uniform handling of the layers is, however, with filter presses with filter elements of large dimensions not possible under normal circumstances. With layers of large size, which are delivered in stiff transporting packages containing stacked therein several layers, there exists already during the withdrawal of the layers from the respective package the danger of bending and breaking the layers. This danger is increased further by the bending of the layers which occurs when placing the layers on edge. Moreover, the insertion of the layers by hand causes damages which frequently make a practical use of the layers impossible.

It is, therefore, an object of the present invention to avoid the manual insertion of such layers in connection with large filter presses and to eliminate the above mentioned drawbacks inherent thereto and instead to carry out these operations automatically and independently of the press operator. In other words, it is an object of the present invention to bring about the insertion of the layers into filter presses by technical means while taking into consideration the fact that large surface filter layers are generally delivered while being stacked in containers or packages and have to be withdrawn directly from the openend container or package or, when the wrapping material was removed, have to be withdrawn from the stack and have to be transferrred to their place of use.

These and other objects and advantages of the invention will appear more clearly from the following specification in connection with the accompanying drawings, in which.

Figure 3:
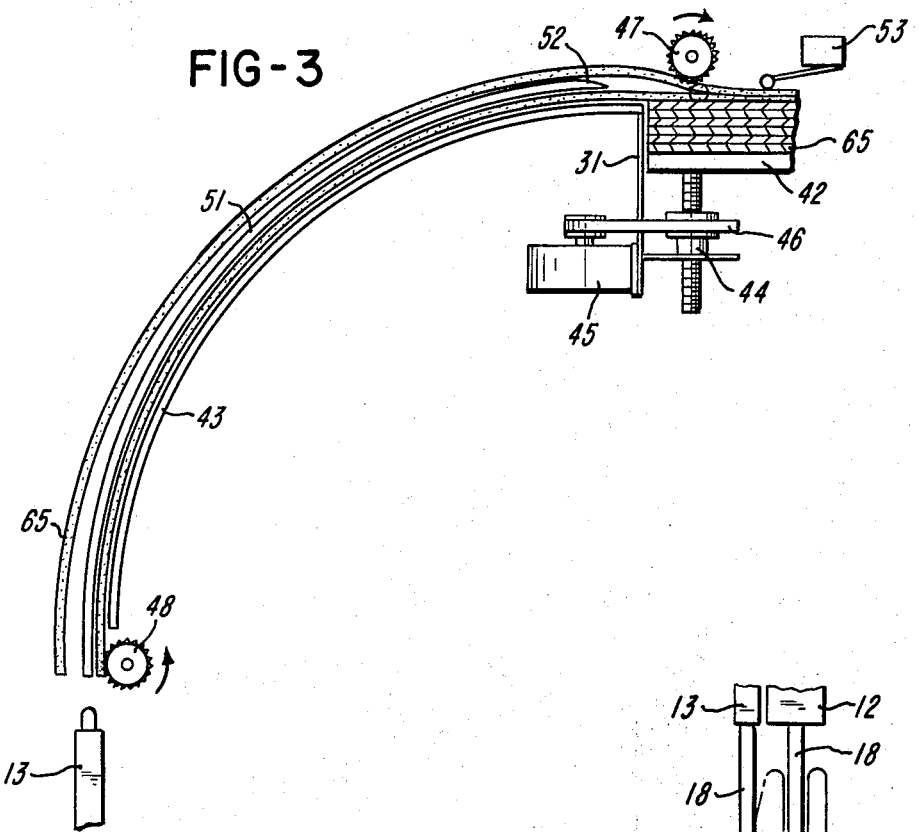
Figure 4:
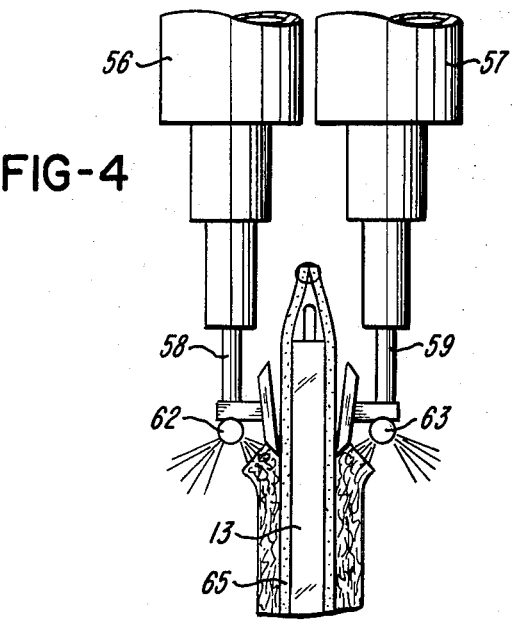

FIGS. 3 and 4 respectively illustrate details of the inserting device according to the invention.

FIG. 4 shows a further detail of the press according to the invention.

The horizontal filter press according to the invention is characterized primarily by a layer inserting device by means of which the layers arriving in stacked condition either in an opened container or without a container are transported from the plane in which they are delivered into a horizontal plane above the filter elements, are then removed individually from the stack and are from above inserted between the filter elements spaced from each other in such a way that an individual layer extends along the oppositely located surfaces of adjacent elements. In case of a double layer, it is inserted in such a way that the connecting back respectively rests on the upper horizontal end of a filter element and hangs downwardly on both sides of the surfaces of the element.

In conformity with the invention, the inserting device comprises primarily a lifting device which is arranged at the front or rear press end and receives a stack of layers. The lifting device according to the invention furthermore comprises a transporting device which is movable back and forth above the filter elements in the longitudinal direction of the press and takes over the stack of layers. The lifting device is adapted to be lifted from or nearly from the press ground surface up to the horizontal plane of the transporting device and is inversely adapted to be lowered. The inserting device according to the invention also comprises elements for transferring the stack of layers to the transporting device, while the transporting device comprises at one discharge side thereof which is directed toward the press end means for taking off the individual layers and lowering the same. According to another embodiment of the present invention, which makes possible the unstacking and insertion of the layers from the container or package in which they arrive and are being transported, the container being transportable in an on edge position and movable by rollers to the filter press, the lifting device consists of a rectangular frame which is provided with a transfer element and is designed to correspond to the dimensions of the layers or the package of layers to be inserted. At least at its lower horizontal border the frame has an angled off supporting surface. The frame is by means of lever arms as well as by means of fluid operable lifting elements connected to the rear end of the press adjacent the movable filter press plate in such a way that the frame in its lower end position will be located approximately verticall on or slightly above the ground surface of the press, and in its upper end position will be located horizontally in the vertical plane of the transporting device.

According to a still further development of the invention, there is provided a transfer device which consists of a motor driven knurled roller which in the region of the upper frame border located opposite to the supporting edge extends over the entire width of the frame. In connection with this embodiment, it is suggested, in conformity with the invention, that the transporting device consist of a carriage which is equipped with a drive motor and is designed substantially in conformity with the dimensions of the frame. This carriage is movable on horizontal rails which are connected to the fixed press end plate and the press traverse and has its delivery side which comprises the means for destacking and lowering of the layers directed toward the front end of the press.

According to the invention it is furthermore suggested that the carriage for destacking the layers includes knurled motor driven rollers which are arranged at the delivery side of the carriage at both sides thereof above the stack of layers. Expediently, the carriage has a bottom which is adjustable as to height by a motor the adjustment as to height of which is adapted to be controlled in conformity with the respective height of the stack of layers by a switch controlling the motor. The switch is operable by the respective uppermost layer of the stack. For inserting the layers, according to a further feature of the invention, the carriage is at the delivery side provided with an arched chute directed toward the filter elements, the chute having motor driven knurled rollers arranged on both sides at the edges thereof. For spreading out double layers, the chute may have arranged on or near its two edges guiding means which are designed in conformity with the arch of the chute and which end in a tip directed toward the delivery side of the carriage.

According to the invention it is furthermore provided that the carriage has associated therewith a device for cleaning the filter elements and/or the filter layers. This device is adapted in spaced relationship to the chute to be connected to the delivery side of the carriage and is movable therewith on the rails for the carriage.

Figure 1:
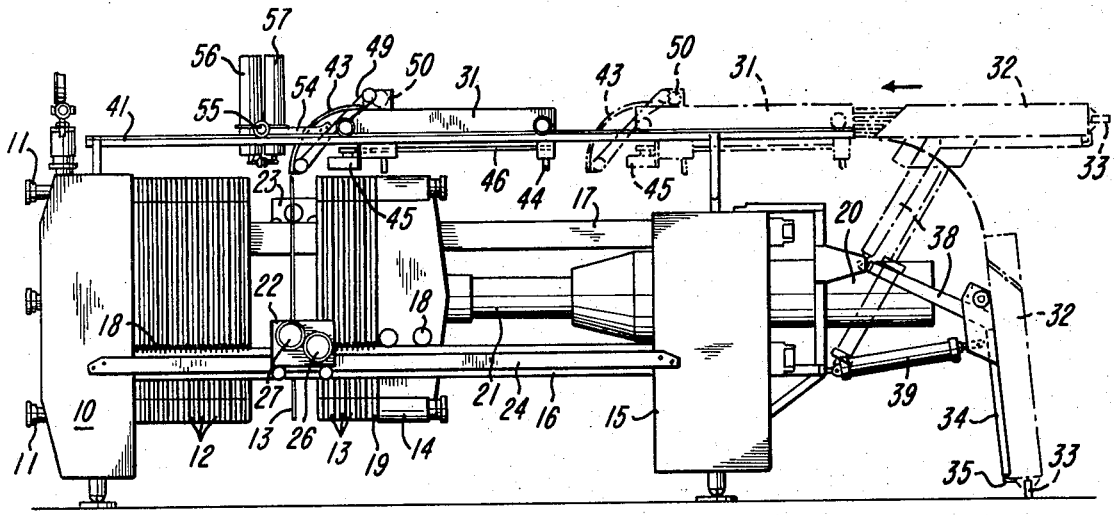
FIG. 1 illustrates a filter press according to the invention with an inserting device as seen from the side.
Figure 2:
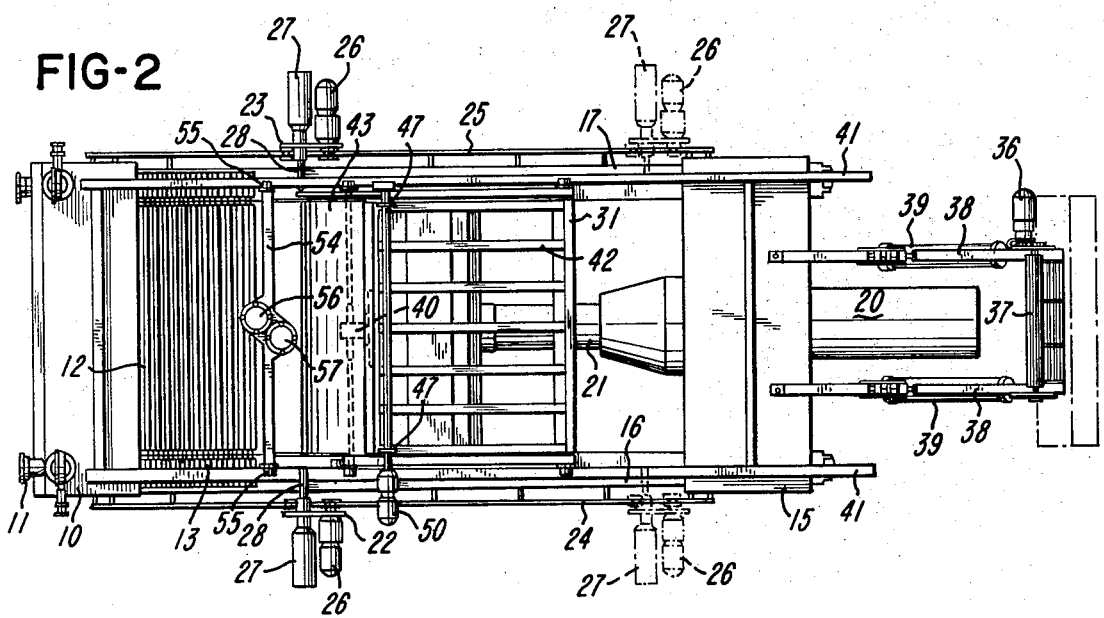
FIG. 2 illustrates a top view of the press shown in FIG. 1.
Figure 5:
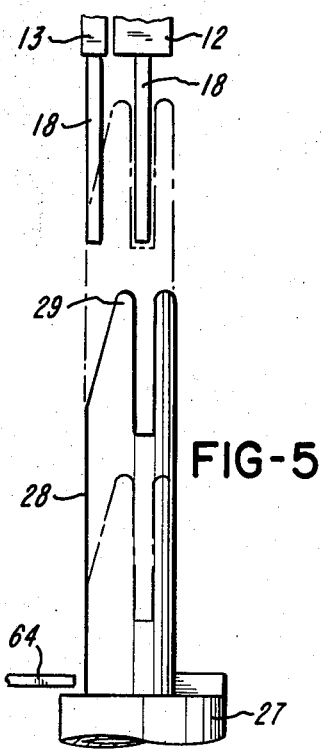

Referring now to the drawings in detail, the filter press of FIGS. 1 and 2 consists primarily of a fixed end plate 10 which is provided with connections 11 for the inlet and outlet of the liquid. The press furthermore comprises a plurality of successively arranged filter elements 11, 12, 19, a movable end plate 14 and a traverse 15. Plate 10 and traverse 15 are placed on the ground surface of the press and are interconnected by parallel spars 16, 17. These spars extend along planes of different heights horizontally at both sides of the press. In the space between the spars 16, 17 there are inserted the filter elements 12, 13, 19 and the plate 14. These elements and the plate are on both sides provided with supporting members 18 and together therewith rest longitudinally displaceably on the spars 16, 17. The filter elements 12, 13 consist of plates and frames which are respectively arranged in pairs opposite to each other in the form of a clear element (Glanzelement) and of a cloudy element. The element 19 represents an end chamber which precedes the plate 14. The plate 14 is under the influence of a hydraulic pressing device 20 located in the traverse 15 and has its back side firmly connected to the piston rod 21 of the pressing device 20. For purposes of longitudinally displacing the individual filter elements 12, 13, displacing devices 22, 23 are provided at both sides of the press. The devices, the longitudinal movements of which are carried out synchronously, respectively consist of a carriage which is guided on a horizontal rail 24, 25 with a drive motor 26 each, and also include a pressure fluid operable cylinder 27 which has a piston, which is longitudinally displaceable into a plurality of positions, with a piston rod 28 directed toward the filter elements 12, 13. The rails 24, 25 are located at both sides of the press approximately at the level of the spars 16, 17 and are in slightly spaced arrangement to the spars connected to the plate 10 and the traverse 15. As will be seen from FIG. 5, the free end of each piston rod 28 is fork-shaped with the forked leg 29, when viewed in the direction toward the fixed end plate 10, tapering in the direction toward the end of the piston rod.

The filter press according to the invention is furthermore equipped with an inserting device for insertion of the filter layers which are delivered in a stiff package 32 in which several filter layers are stacked one upon the other. The packages are movable on rollers 33. The device comprises primarily a lifting device in the form of a rectangular frame 34 receiving the stack of filter layers in the open package 32 and also comprises a transporting device which is located above the press and is movable back and forth in the longitudinal direction of the press. This transporting device is adapted to take over the stack of filter layers from the package 32, preferably by means of a displaceable carriage 31. The frame 34 which is dimensioned in conformity with the dimensions of the package 32 is provided at its lower end with an angled-off supporting edge 35 and in the range of the oppositely located upper end is provided with a knurled roller 37 which is driven by a motor 36 and extends transverse across the frame 34. The back side of frame 34 is by means of parallel arms 38 pivotally connected to the traverse 15 and in its lower end position rests nearly vertically on or slightly above the ground surface of the press. The lifting movements of frame 34 from the lower end position into the upper horizontal end position, which is shown in FIG. 1 in dash lines and in which the frame is located in the plane of the carriage 31 and vice versa, are effected by fluid operable lifting cylinders 39.

The carriage 31, which as to its surfaces is dimensioned in conformity with the frame 34, is by means of a motor 40 displaceable on rails 41 which extend over the entire press and rest on plate 10 and traverse 15. The carriage 31 has a bottom 42 which is adjustable as to height and at the layer dispensing side which is directed toward the press plate 10 has an arched chute 43 leading to the filter elements 12, 13. For adjusting the bottom 42 as to height, there are provided driving means, expediently a plurality of screw drives 44, which threadedly engage the lower side of the bottom and are driven by a common motor 45 through an endless toothed belt 46. Ahead of the transfer to the chute 43 and at the free ends of the chute, the carriage 31 ia at both sides and, more specifically, at the carriage edge and at the chute edge, provided with knurled rollers 47, 48 which are drivingly connected through a belt drive 49 with a motor 50. For spreading out double layers, the chute 43 may on or near the two edges be provided with curved guiding means 51 which are adapted to the arch of the chute and which end in a tip 52 (FIG. 3) which is directed toward the carriage 31. In the plane of the knurled roller 47, the carriage 31 is provided with a switch 53 for controlling the motor 45.

At the delivery side, expediently a cleaning device 54 is connected to the carriage 31. This cleaning device is arranged at a predetermined distance from the chute 43 and by means of rollers 55 is likewise movable on rails 41. The cleaning device has two vertically arranged pressure fluid operable cylinders 56, 57 which at the free end of their telescopically inwardly and outwardly movable piston rods 58, 59 respectively support scrapers 60, 61 extending over the width of a filter element 12, 13 or a filter layer, and also support a spray pipe 62, 63 respectively. The scrapers 60, 61 and the spray pipes 62, 63 are arranged in spaced relationship to each other opposite each other, while the spacing therebetween corresponds to the thickness of the filter elements 12, 13. The scrapers 60, 61 and the spray pipes 62, 63 are together movable upwardly and downwardly (FIG. 4).

For the insertion of the filter layers 65, in case in alluvial filtration, in which instance double layers are used which are equipped with connecting back portions and which serve for depositing an auxiliary filter cover thereon, and which are adapted to be suspended over the clear elements 13, first an open package 32 containing several layers 65 is placed upon the frame 34 lowered to the ground surface of the press and thereupon in an upward movement the package 32 is by the lifting cylinder 39 brought into the plane of the carriage 31. By means of the rotating knurled roller 37, the container 32 is subsequently conveyed to the carriage 31 which latter, to this end, occupies its end position shown in dash lines in FIG. 1. When thereupon by means of the pressing device 20 the press is opened and by means of the piston rod 21 the end plate 14 with chamber 19 is moved into the end position near the traverse 15, the displacing devices 22, 23 arranged on both sides of the press start their longitudinal movement and from the starting position illustrated in dash lines in FIG. 2 move into the region of a front clear element 13 which together with the remaining elements 12, 13 forms the filter packet engaging the plate 10.

By means of limit switches or similar feeler elements respectively arranged on the displacing devices 26, 27 and not illustrated in the drawings, which engage the supporting members 18 of the first clear element 13, the longitudinal movement of the devices 26, 27 is stopped and simultaneously the piston rods 28, which up to that point occupied an ineffective position, are respectively adjusted in the direction toward the supporting members 18 of the element 13. Each rod 28 engages a supporting member 18 and by means of the fork-shaped leg 29 separates the clear element 13 from the adjacent cloudy element 12. A switch 64 which is subsequently actuated by the moved out piston rods 28 will then switch-on the motors 26 for the devices 22, 23. As a result thereof, the respective engaged clear element 13 is moved in the direction toward the plate 14, and is stopped in the press chamber between plate 14 and the cloudy element 12 following the filter packet by an electric timing element which is not illustrated in the drawings and which turns off the motor 26. The motor 40 which is simultaneously turned on by the timing element subsequently moves the carriage 31 out of its dash line end position of FIG. 1 until the end of the chute 43 is located above the clear element 13 placed into readiness. A non-illustrated limit switch brings the carriage 31 to a stop in this position. The limit switch simultaneously turns on the motor 45. As a result thereof, the carriage bottom 42 is by means of the belt drive 46 and the transmission 44 moved upwardly until that layer 65 which in the open package 32 represents the uppermost layer is engaged by the knurled roller 47 and the switch 53. The then actuated switch 53 stops the motor 50 for the rollers 47, 48 so that the layer 65, in view of the action of the rollers 47, slides over the chute 43 and in the region of the guiding means 51 reaching between the flaps of the filter layers is spread apart so that during the further downward movement it will with a flap enter the bite of the rollers 48. As a result thereof the layer 65 will be lowered over the element 13 and will be held by means of its connecting back portion on the upper horizontal end of the filter element 13. After a predetermined time period selected for the insertion of the layer, a further non-illustrated timer turns on the motors 26 whereupon the devices 22, 23 with the still effective piston rods 28 move the clear element 13 until it engages the chamber 19. Switches which are actuated in this end position (these switches not being shown) stop the devices 22, 23 and bring about that the piston rods 28 disengage from the supporting members 18 of the clear element 13. The switches 64 which during the return movement of the piston rods 28 are actuated, will again turn on the motors 26 whereby the devices 22, 23 move toward the filter packet, engage the respective front cloudy element 12 in the above described manner and without interruption move the cloudly element 12 into engagement with the clear element 13 which is already on the chamber 19. Similarly, subsequently all clear and cloudy elements 12, 13 are taken off or detached from the filter packet and are moved into engagement with a previously adjusted filter element in the direction toward the end plate 14. In this way all clear elements 13 are in the above described manner first moved into an intermediate distance position and are provided with layers 65. Subsequently, the devices 22, 23 and the carriage 31 return to the dash line end position shown in FIGS. 1 and 2 so that by means of the pressing device 20 the newly formed filter packet is displaced in the direction toward the plate 10, the press is closed, and the alluvial filtration can be carried out.

For cleaning the layers 65 from adhering filter cakes following the filtration, the clear element 13 in the filter packet is with the press in open condition likewise displaced to its intermediate distance position for which purpose the devices 22, 23 are moved in the manner described above. In contradistinction to the insertion procedure for the layers, in this instance, the carriage 31 is with the cleaning device 54 connected thereto moved up to the respective clear element 13 standing in readiness and is stopped by means of a non-illustrated limit switch with the device 54 occupying a position above the element 13. With the downward movement of the piston rods 58, 59 released simultaneously by the end switches, the scrapers 60, 61 slide along the outer surfaces of the layer 65 hanging down over the element 13 and remove the filter cake. After return of the scrapers 60, 61 to their starting position, the again affective devices 22, 23 move the clear element 13 into engagement with the chamber 19 connected to plate 14, then move in conformity with the moving steps carried out during the insertion of the filter layers back to the filter packet and take over the now foremost cloudy element 12 which without intermediate stopping will pass to the previously adjusted clear element and engage the same. In this way all elements 12, 13 are moved in the direction toward plate 14 while the clear elements 13 occupy an intermediate position and their layers 65 are scraped and the displacement of the cloudy elements 12 takes place without intermediate stop.

If a subsequent wet cleaning of the cloudy elements 12 and of the layers 65 hanging over the clear elements 13 is desired, the devices 22, 23 move back the elements 12, 13 individually in the direction toward the plate 11. In this way, again the respective clear elements 13 are temporarily moved to an intermediate distance position and are treated by means of the spray pipes 62, 63 which are moved on the rods 58, 59 and are moved upwardly and downwardly. The wet cleaning of the cloudy elements 12 is likewise effected by the spray pipes 62, 63 in the course of the return movement of the elements which is effected without intermediate stop while the spray pipes 62, 63 retain their upper end position.

It is, of course, to be understood that the present invention is, by no means, limited to the particular showing in the drawings but also comprises any modifications within the scope of the appended claims.

It is furthermore to be noted that the layer inserting device described above may also be used for filter presses for liquid filtration by means of prefabricated filter layers.

What is claimed is:

1. In a horizontal multiple plate filter press having a frame and having plates to receive filter members on the opposite sides and frame members on opposite sides of said plates, and rods in the press frame on which said plates and frame members are guided for horizontal movement, means for separating said plates from said frame member to expose opposite sides of said plates, a filter member inserting device comprising conveyor means for conveying stacks of filter members to a predetermined position above said plates, feed means operable to withdraw filter members individually from the stack of filter members on said conveyor means, and delivery means operable to receive filter members from said feed means and guide the filter members into position on opposite sides of a said plate which is separated from the said frame members disposed on opposite sides thereof.

2. A multiple plate filter press according to claim 1 in which the filter members for each plate are joined together at the top and the feed means withdraws two connected filter members at one time from the stack, said delivery means guiding the connected filter members to the said plate so one filter member is disposed on each side of the plate and the interconnected region of the filter members is at the top of the plate.

3. A multiple plate filter press according to claim 1 in which said conveyor means comprises a carriage moveable horizontally above the press frame, and a lift device at one end of the press frame adapted to receive a stack of filter members at floor level and lift the stack to the level of said carriage, means on the lift device to move a stack of filter members therefrom to said carriage from one end of the carriage, said feed means being mounted on said carriage at the other end thereof.

4. A multiple plate filter press according to claim 3 in which said lift device comprises a support frame adapted to receive a stack of filter elements therein, said support frame when lowered to floor level being tilted upwardly and when in elevated position being horizontal, an end member on the support frame for supportingly engaging one end of a stack of filter members supplied thereto when the support frame is in lowered position, arm connected to the support frame and pivoted to the press frame, and fluid motor means connected between the press frame and the support frame to raise and lower the support frame.

5. A multiple plate filter press according to claim 4 in which the means for moving a stack of filter members from said support frame to said carriage comprises roller means on the support frame near the end thereof which is nearest the carriage in elevated position of said support frame.

6. A multiple plate filter press according to claim 4 which includes horizontal rails on the press frame moveably supporting said carriage, said carriage in longitudinal and lateral dimension conforming to the size of a stack of filter members, said carriage having a drive motor thereon for moving the carriage along the said rails.

7. A multiple plate filter press according to claim 3 in which said feed means comprises rollers near the end of the carriage from which filter members emerge when supplied to said delivery means, said rollers engaging the upper side of the uppermost filter member in the stack thereof on said carriage.

8. A multiple plate filter press according to claim 3 which includes means for adjusting at least the bottom wall of said carriage in the vertical direction, and a switch engageable with the uppermost filter member on the carriage and controlling said means.

9. A multiple plate filter press according to claim 1 in which said delivery means comprises a curved chute element having the upper end horizontal and adjacent said feed means and the other end vertical and terminating near the top edge of a said plate therebeneath.

10. A multiple plate filter press according to claim 9 in which said chute element comprises means for separating a pair of filter members which are delivered at one time so each filter member will be on a respective side of the plate.

11. A multiple plate filter press according to claim 1 which includes cleaning means for said plates connected to said conveyor means for movement therewith.

12. A multiple plate filter press according to claim 1 in which said cleaning means comprises scrapers and spray pipes in opposed spaced relation and adapted for movement along opposite sides of a plate, and fluid operable means for actuating said scrapers and spray pipes.

13. A multiple plate filter press according to claim 1 which includes means for moving said plates and frame members longitudinally in said press frame.

14. A multiple plate filter press according to claim 13 in which said means for moving said plates and frame members includes fluid operated rods notched on the ends to engage said plates.

* * * * *